(12) United States Patent
Yamaguchi

(10) Patent No.: US 8,504,833 B2
(45) Date of Patent: Aug. 6, 2013

(54) RELAY DEVICE, WIRELESS COMMUNICATIONS DEVICE, NETWORK SYSTEM, PROGRAM STORAGE MEDIUM, AND METHOD

(75) Inventor: Satoru Yamaguchi, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 122 days.

(21) Appl. No.: 13/189,590

(22) Filed: Jul. 25, 2011

(65) Prior Publication Data

US 2012/0030466 A1 Feb. 2, 2012

(30) Foreign Application Priority Data

Jul. 29, 2010 (JP) ................. 2010-170437

(51) Int. Cl.
*H04L 9/32* (2006.01)
*H01L 29/06* (2006.01)

(52) U.S. Cl.
USPC ............................ 713/168; 713/150; 713/151

(58) Field of Classification Search
None
See application file for complete search history.

(56) References Cited

U.S. PATENT DOCUMENTS

| | | | | |
|---|---|---|---|---|
| 8,233,424 B2 * | 7/2012 | Tamura | ........................ | 370/315 |
| 8,272,036 B2 * | 9/2012 | Jou et al. | ............................ | 726/2 |
| 8,327,143 B2 * | 12/2012 | Ilyadis | .......................... | 713/170 |
| 2005/0238172 A1 * | 10/2005 | Tamura | ........................ | 380/270 |
| 2010/0272008 A1 * | 10/2010 | Tamura | ........................ | 370/315 |
| 2010/0303001 A1 * | 12/2010 | Tamura et al. | ................ | 370/315 |
| 2011/0205956 A1 * | 8/2011 | Inada | ............................ | 370/315 |
| 2013/0067544 A1 * | 3/2013 | Kwark et al. | ..................... | 726/4 |

FOREIGN PATENT DOCUMENTS

| | | |
|---|---|---|
| JP | 2005-130452 A | 5/2005 |
| JP | 2007-013348 A | 1/2007 |
| JP | 4313425 B1 | 5/2009 |

OTHER PUBLICATIONS

Buffalo's Unique Technology—AOSS™ Going wireless at the touch of a button; printed out in year 2013.*
Feature Overview Buffalo WebAccess 3; printed out in year 2013.*
Jiro Hasegawa et al., "Musen LAN no Kihon to Sekyuritei Gijutsu" (Wireless LAN Basics & Security Technology), Interface, Japan, CQ Publishing Co., Ltd., Feb. 1, 2007, vol. 33, No. 2, pp. 128-136.

* cited by examiner

*Primary Examiner* — David Y Jung
(74) *Attorney, Agent, or Firm* — Oblon, Spivak, McClelland, Maier & Neustadt, L.L.P.

(57) ABSTRACT

A relay device first uses latest authentication data to determine whether request-authentication data transmitted from a wireless communications device is valid. If the latest authentication data is used to determine that the request-authentication data is valid, the relay device carries out relayed communications with the wireless communications device. If the latest authentication data is used to determine that the request-authentication data is invalid, the relay device next uses a former authentication data to determine whether the request-authentication data is valid. If the former authentication data is used to determine that the request-authentication data is valid, the relay device provides the wireless communications device with the latest authentication data to update authentication data in the wireless communications device.

15 Claims, 8 Drawing Sheets

F I G. 1
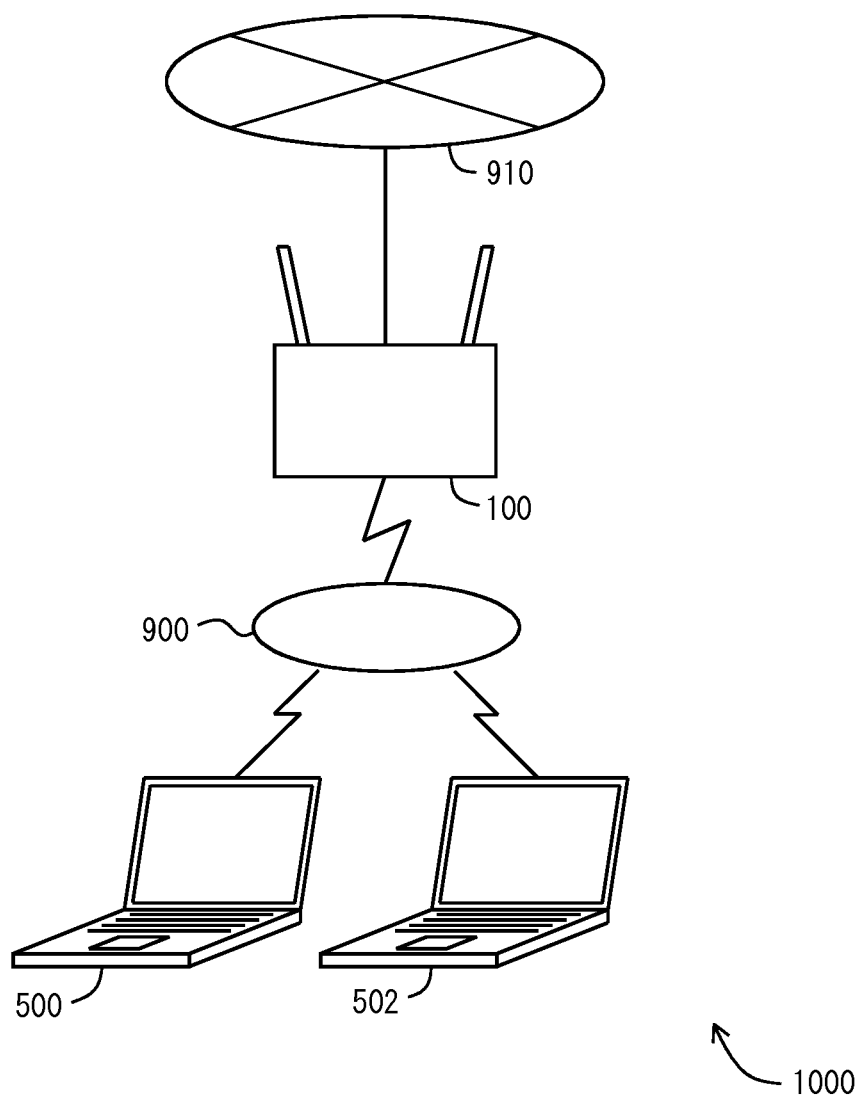

F I G. 5
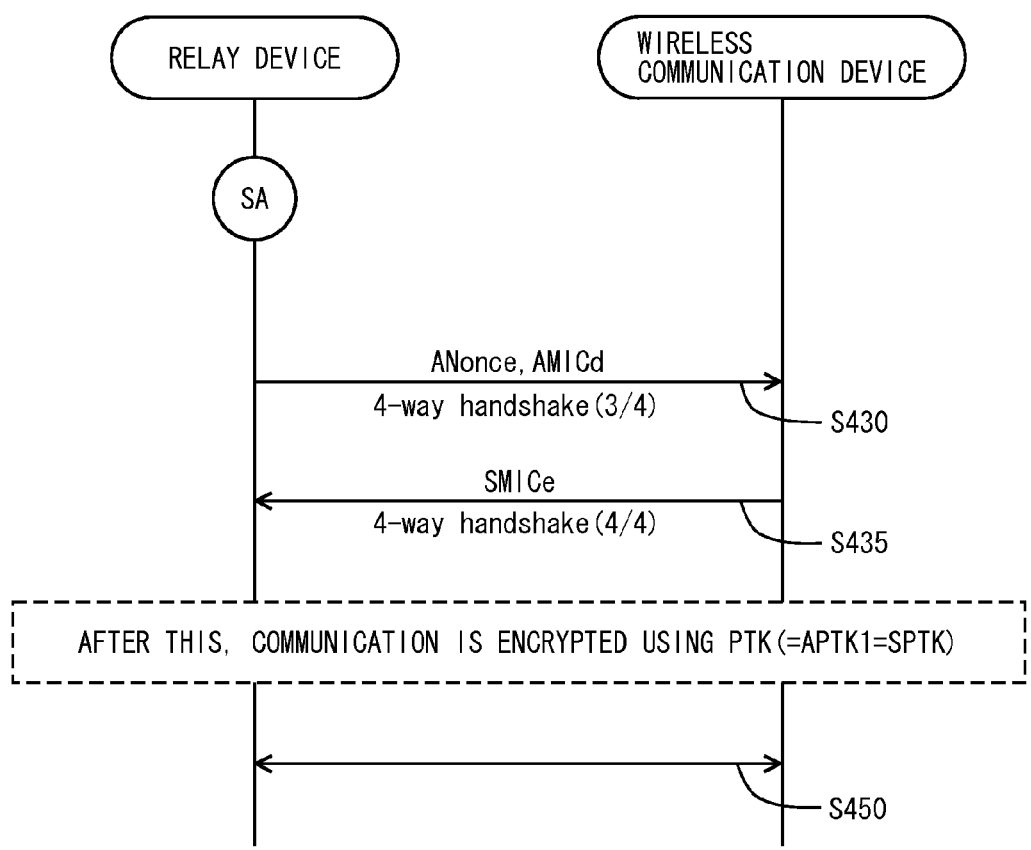

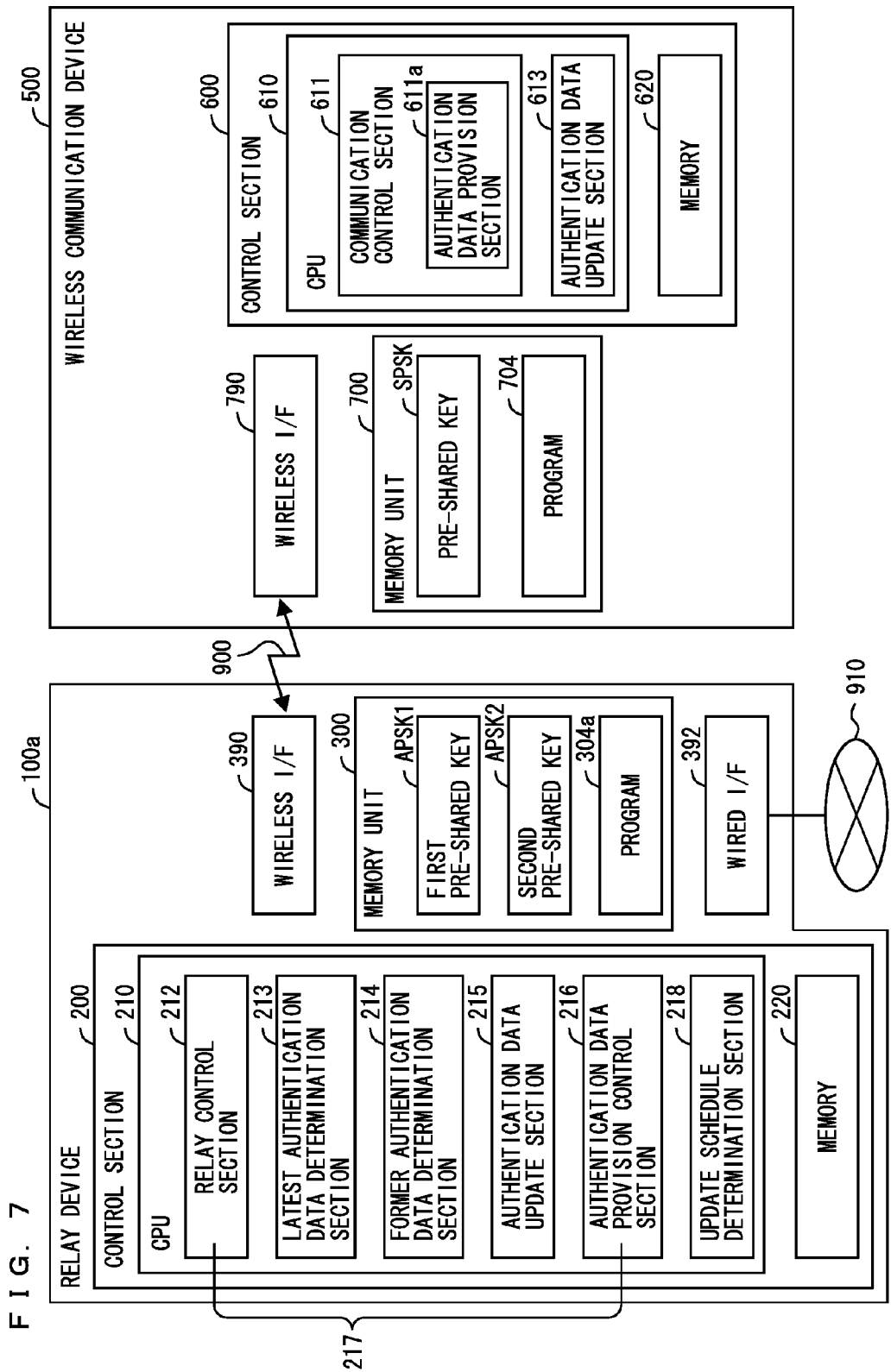

RELAY DEVICE, WIRELESS COMMUNICATIONS DEVICE, NETWORK SYSTEM, PROGRAM STORAGE MEDIUM, AND METHOD

CROSS REFERENCE TO RELATED APPLICATION

The disclosure of Japanese Patent Application No. 2010-170437, filed in JAPAN on Jul. 29, 2010 is incorporated herein by reference.

BACKGROUND OF THE INVENTION

1. Field of the Invention

The present invention relates to relay devices, wireless communications devices, network systems, program storage media, and control methods therefor, and more specifically relates to technology for security during wireless communications in network systems including relay devices and wireless communications devices.

2. Description of the Background Art

Conventionally, as part of network systems carrying out data communications, access points (relay devices) that connect wireless communications devices to a network to carry out wireless communications are used. In order to reduce the possibility of access by users who are not valid users and have no authentication (also referred to as "unauthorized access"), the access points determine whether to allow the connection before connecting the wireless communications devices to the network. Various methods are used for such determination. One example is a method (e.g., the WPA-PSK (Wi-Fi protected access-pre-shared key) or the WPA2-PSK) of using previously-registered shared keys between the access points and the wireless communications devices (see Japanese Laid-Open Patent Publication No. 2007-013348).

In this area, communications data transmitted/received between the access points and the wireless communications devices are easily intercepted. Therefore, it is preferable, in technology using the shared keys described above, to update the keys (avoid continuous use of the same key for a long time period) to reduce the possibility of unauthorized access. However, operations to update the keys between the access points and the wireless communications devices are burdensome to users. Particularly in recent years, users tend to use a multiple number of wireless communications devices (e.g., computers, video game devices, mobile phones, TVs, video recorders, and the like). In this case, updating keys for all the wireless communications devices is particularly burdensome to users. As a result, users do not update the keys, which risks impairing security.

Such problem is not limited to systems that use the above-mentioned WPA-PSKs or WPA2-PSKs, but is a problem common to systems that use previously configured data to determine whether to permit a connection.

SUMMARY OF THE INVENTION

Therefore, an object of the present invention is to provide a relay device, a wireless communications device, a network system, a program storage medium, and a method which use wireless communications technology, to achieve reduction of the possibility of unauthorized access, while avoiding overburdening the user.

The present invention solves one or more of the above-mentioned problems, and can be realized by the following embodiments or application examples.

The present invention is directed to a relay device for carrying out wireless communications with a wireless communications device via a communications interface. In order to achieve the above object, the relay device of the present invention includes: a memory unit storing a plurality of authentication data for determining whether request-authentication data, received from the wireless communications device requesting relayed communications with another communications device, is valid; an authentication data updating section for updating current-generation authentication data, and storing, in the memory unit, the updated current-generation authentication data as latest authentication data and storing authentication data at least one generation earlier than the updated current-generation authentication data as former authentication data; a latest authentication data determination section for using the latest authentication data to determine whether the request-authentication data received from the wireless communications device is valid; a relay control section for executing the requested relayed communications if the latest authentication data determination section has determined that the request-authentication data is valid; a former authentication data determination section for using the former authentication data to determine whether the request-authentication data is valid if the latest authentication data determination section has determined that the request-authentication data is invalid; and an authentication data provision section for providing the latest authentication data to the wireless communications device if the former authentication data determination section has determined that the request-authentication data is valid.

According to the configuration, the authentication data update section of the relay device can reduce the possibility of the unauthorized access by updating the authentication data. Even in the case where the request-authentication data from the wireless communications device becomes invalid based on the latest authentication data because of the update of the authentication data, if the request-authentication data is valid based on the former authentication data, the authentication data provision section provides the latest authentication data to the wireless communications device. Therefore, a wireless communications device of an authorized user can obtain the latest authentication data without overburdening the user. In addition, the wireless communications device is able to use the latest authentication data to obtain an affirmative result. As a result, the relay device having the above configuration can reduce the possibility of the unauthorized access while avoiding overburdening the user.

The authentication data provision section may encrypt the latest authentication data and transmit the encrypted latest authentication data to the wireless communications device. In this case, the authentication data provision section may use common-key cryptography to encrypt the latest authentication data. In addition, the authentication data provision section may multi-encrypt the latest authentication data.

According to the configuration, the possibility that an unauthorized user illegitimately identifies a latest authentication data can be reduced.

It should be noted that the relay device may further include update schedule determination section for determining a schedule whereby the current-generation authentication data is updated by the authentication data update section, and the authentication data update section may automatically update the authentication data, according to the schedule determined by the update schedule determination section.

According to this configuration, the authentication data update section automatically updates the authentication data, according to the schedule, thus automatically reduces the possibility of the unauthorized access.

Furthermore, the present invention is directed to a wireless communications device for carrying out wireless communications with a relay device via a communications interface. In order to achieve the above object, the wireless communications device of the present invention includes: a memory unit storing reference authentication data for verifying request-authentication data whereby relayed communications with another communications device is requested of the relay device; a request-authentication data provision section for using the reference authentication data stored in the memory unit to verify the request-authentication data, and for providing the verified request-authentication data to the relay device; and an authentication data update section for acquiring latest authentication data from data provided by the relay device, and updating, by the acquired latest authentication data, the reference authentication data stored in the memory unit.

According to the configuration, the authentication data update section uses provision data provided by the relay device to store the updated reference authentication data in a memory unit. Therefore, in the case where the relay device executes a process (e.g., update of passphrase or the like) which involves change of a valid reference authentication data, if the relay device provides the wireless communications device with the provision data representing the updated reference authentication data, the wireless communications device can use the data provided by the relay device to update the reference authentication data without overburdening the user. Also, the process which involves the change of the valid reference authentication data can reduce the possibility of the unauthorized access. As a result of these, the wireless communications device having the above configuration can reduce the possibility of the unauthorized access while avoiding overburdening the user.

It should be noted that the present invention can be realized by various modes other than the relay device and the wireless communications device. For example, the present invention can be realized by a control method of the relay device, a control method of the wireless communications device, a network system which includes the relay device and the wireless communications device and a control method of the network system, a computer program for realizing functions of the devices or the methods, a storage medium having stored therein the computer program, and the like.

The present invention is usable to a network system which includes relay devices and wireless communications devices, and the like, and particularly useful in cases where improving the security at wireless communications is desired. These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a configuration of a network system 1000 according to a first embodiment of the present invention;

FIG. 5 is a sequence diagram showing a process performed if a determination result in step S215 of FIG. 4 is affirmative;

FIG. 7 is a block diagram showing in detail respective configurations of a relay device 100a and wireless communications device 500 according to a third embodiment of the present invention.

DESCRIPTION OF THE PREFERRED EMBODIMENTS

Figure 2:
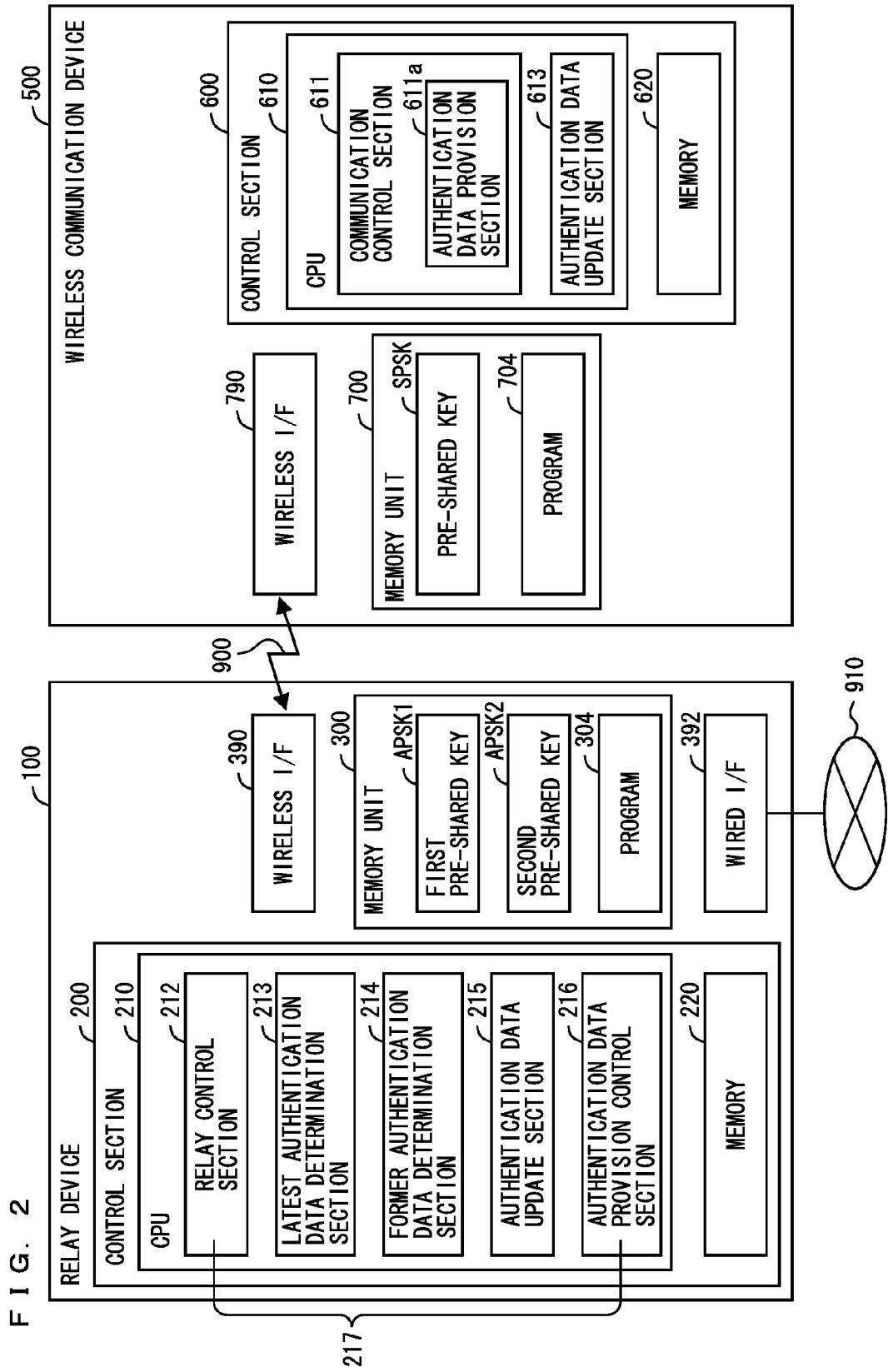
FIG. 2 is a block diagram showing in detail respective configurations of a relay device 100 and wireless communications device 500 according to the first embodiment of the present invention.

Hereinafter, embodiments of the present invention will be described with reference to the accompanying drawings.

First Embodiment

FIG. 1 is a diagram showing a configuration of a network system 1000 according to a first embodiment of the present invention. The network system 1000 has a network 910, a relay device 100 connected to the network 910, and wireless communications devices 500 and 502 connected to the relay device 100 by wireless communications. The relay device 100 and the wireless communications devices 500 and 502 are wireless LAN (local area network) communications devices compliant with, for example, the Institute of Electrical and Electronics Engineers (IEEE) 802.11 standard. A standard other than IEEE 802.11 may be employed as the wireless communications standard.

In the present embodiment, the network 910 is an internal network of limited-area configuration (e.g., a LAN such as an office network, or a WAN (wide area network) such as a network through an internet service provider providing a connection to the Internet). The network 910 is connected to the Internet (not shown).

The relay device 100 is an access point which uses a wireless network 900 to carry out wireless communications with the wireless communications devices 500 and 502. The wireless communications devices 500 and 502 are any communications devices configured to carry out wireless communications, such as tablet PCs, mobile phones, video game devices, and consumer electronic equipment (such as TVs, video cameras, or video recorders). In the present embodiment, a case where the wireless communications devices 500 and 502 are personal computers is described by way of example. It should be noted that the number of wireless communications devices included in the network system 1000 of the present invention may be other than two.

In response to a request received from the wireless communications device 500 or 502, the relay device 100 makes a connection determination, in accordance with the WPA2-PSK scheme. The connection determination is a determination of whether to allow the wireless communications device 500 or 502 to be connected, via the relay device 100, to the network 910 connected to the relay device 100. In other words, the connection determination is a determination of whether to allow the wireless communications device 500 or 502 communications (also referred to as relayed communications) with various communications devices (e.g., a web server, mail server, other personal computer, etc. not shown) via the relay device 100.

If the result of the connection determination is affirmative, the relay device 100 connects the wireless communications device 500 or 502 to the network 910. This allows the wireless communications device 500 or 502 to carry out communications with various communications devices via the network 910. On the other hand, if the result of the connection determination is negative, the relay device 100 does not connect the wireless communications device 500 or 502 to the network 910. This lets the relay device 100 reduce the possibility of unauthorized access.

FIG. 2 is a block diagram showing in detail respective configurations of the relay device 100 and wireless communications device 500 according to the first embodiment of the present invention. It should be noted that, in FIG. 2, within the configuration of the wireless communications device 500 only that configuration relating to the present invention is shown; illustration of the configuration necessary for achieving personal computer functionality is omitted. Furthermore, the configuration of the wireless communications device 502 is the same as that of the wireless communications device 500, and thus the description thereof is omitted.

Hereinafter, a method of communications between the relay device 100 and the wireless communications device 500 will be described.

First, the configuration of the relay device 100 shown in FIG. 2 will be described.

The relay device 100 has a wireless interface (I/F) 390 for carrying out wireless communications, a wired interface (I/F) 392 carrying out wired communications, a control section 200 which controls the relay device 100, and a memory unit 300 which stores therein various items of information.

The wireless interface 390 is an interface for carrying out wireless communications with the wireless communications device 500 using the wireless network 900. As described above, IEEE 802.11 or a standard other than IEEE 802.11 may be employed as the wireless communications standard.

The wired interface 392 is an interface which connects to a communications line compliant with, for example, IEEE 802.3 for carrying out wired communications. In the example shown in FIG. 2, the network 910 is connected to the wired interface 392. A standard other than IEEE 802.3, for example, power line communication (PLC), may be employed as the standard of the wired interface.

Both the wireless interface 390 and the wired interface 392 correspond to "communications interfaces" for carrying out data communications. Usually, a plurality of communications paths are connected to the communications interfaces. In the present embodiment, a communications path to the wireless communications device 500 and a communications path to the network 910 are respectively connected to the communications interfaces. The relay device 100 relays communications between the communications paths.

The memory unit 300 is, for example, a writable nonvolatile memory (such as a flash memory) and stores settings and programs which are used for operation of the relay device 100. In the example shown in FIG. 2, the memory unit 300 stores various items of information including a first pre-shared key APSK1, a second pre-shared key APSK2, and a program 304.

The control section 200 is a computer having a CPU (central processing unit) 210 and a memory 220 (DRAM (dynamic random access memory), for example), and controls the relay device 100. The CPU 210 executes the program 304 stored in the memory unit 300, thereby realizing functions of various process sections including a relay control section 212, a latest authentication data determination section 213, a former authentication data determination section 214, an authentication data update section 215, and an authentication data provision control section 216. Hereinafter, the CPU 210, in accordance with a program, executing a function as a given process section will also be expressed as that process section executing the process.

The relay control section 212 relays communications among a plurality of communications devices (e.g., the wireless communications device 500 and other relay devices not shown) connected to the communications interfaces (the wireless interface 390 and the wired interface 392). The relay control section 212 realizes a so-called routing function (relay at a layer 3 level) to relayed communications. Information (e.g., route information (also referred to as "routing table")) necessary for the routing function is stored in the memory unit 300 (not shown).

It should be noted that the relay control section 212 may realize other functions (e.g., a so-called bridging function (relay at a layer 2 level)) instead of the routing function for communications relay. In addition, the relay control section 212 may operate as a mere repeater.

The latest authentication data determination section 213 makes a connection determination, based on the first pre-shared key APSK1. The former authentication data determination section 214 makes a connection determination, based on the second pre-shared key APSK2. The first pre-shared key APSK1 is a presently used (current-generation) key and is synonymous with latest authentication data. The second pre-shared key APSK2 is a key (of one generation earlier) used prior to the first pre-shared key APSK1 and is synonymous with former authentication data. The authentication data update section 215 updates the first pre-shared key APSK1 used by the latest authentication data determination section 213 and the second pre-shared key APSK2 used by the former authentication data determination section 214. The authentication data provision control section 216 controls a process whereby the wireless communications device 500 is provided with the first pre-shared key APSK1 being the latest authentication data. The connection determination process, an update process, and a provision process which are performed by the corresponding components described above will be described later in detail.

It should be noted that a user can input setting values or instructions to the relay device 100 by various methods. For example, the relay device 100 may have an operation component (e.g., buttons or touch panel) not shown. In that case, the user operates the operation component to input the setting values or instructions. Alternatively, the user may display on a terminal, connected to the communications interfaces, a web page for configuring the relay device 100, and input the setting values or the instructions through the web page. In addition, the terminal connected to the communications interface may execute software dedicated to carrying out the configuring process.

Next, the configuration of the wireless communications device 500 shown in FIG. 2 will be described.

The wireless communications device 500 has a wireless interface (I/F) 790 for carrying out wireless communications, a control section 600 which controls the wireless communications device 500, and a memory unit 700 which stores various items of information.

The wireless interface 790 is an interface for carrying out wireless communications using the relay device 100 and the wireless network 900. The memory unit 700 is, for example, a writable nonvolatile memory (such as a hard disk drive or SSD (Solid State Drive)) and stores settings and programs which are used for operation of the wireless communications device 500. In the example shown in FIG. 2, the memory unit 700 stores various items of information including a pre-shared key SPSK and a program 704. The pre-shared key SPSK is synonymous with reference authentication data which is used for verifying data requesting of the relay device 100 a connection to the wireless network 900.

The control section 600 is a computer having a CPU 610 and a memory 620 (DRAM, for example), and controls the wireless communications device 500. The CPU 610 executes the program 704 stored in the memory unit 700, thereby realizing functions of various process sections including a communications control section 611 and an authentication data update section 613. Hereinafter, the CPU 610, in accordance with a program, executing a function as a given process section will also be expressed as that process section executing the process.

The communications control section 611 controls the wireless interface 790 to carry out wireless communications with the relay device 100. The communications control section 611 includes an authentication data provision section 611a. The authentication data provision section 611a uses the pre-shared key SPSK stored in the memory unit 700 to verify data that is used for the connection determination in the relay device 100, i.e., request-authentication data, and the authentication data provision section 611a provides the request-authentication data to the relay device 100. The authentication data update section 613 updates the pre-shared key SPSK which is used by the authentication data provision section 611a. The connection determination process and update process performed by the corresponding components described above will be described later in detail.

It should be noted that the user can input setting values or instructions to the wireless communications device 500 by various methods. For example, the wireless communications device 500 may have an operation component (e.g., keyboard or touch panel) not shown. In that case, the user operates the operation component to input the setting values or instructions. Also, the communications control section 611 may prepare the pre-shared key SPSK according to instructions by the user, and store the prepared pre-shared key SPSK in the memory unit 700.

Figure 3:
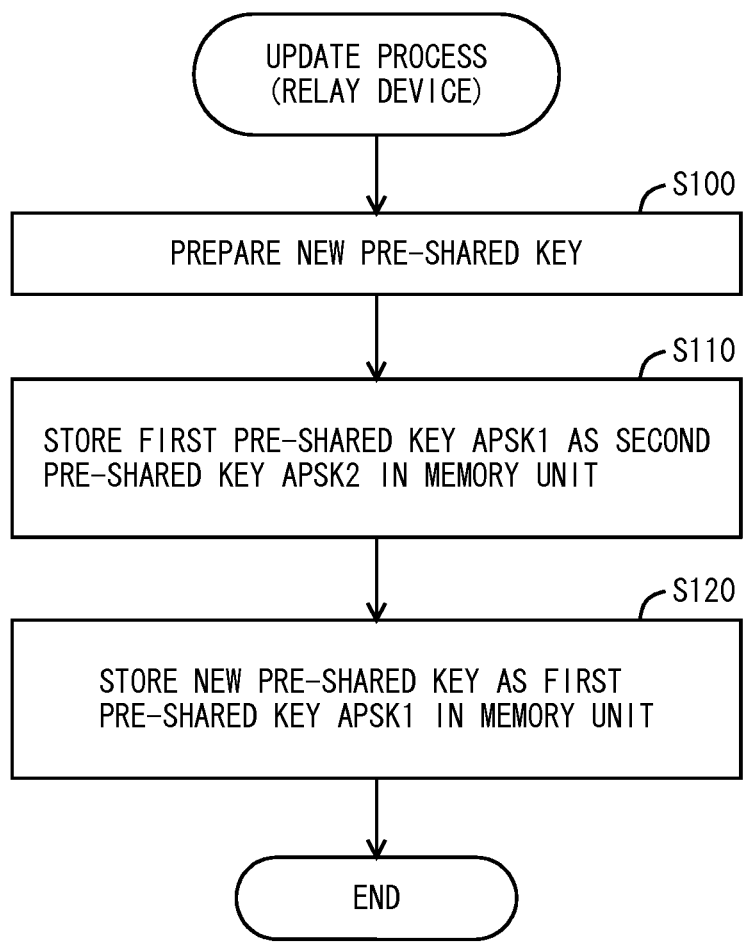
FIG. 3 is a flowchart showing a procedure of an update process performed by an authentication data update section 215.

Next, the update process performed by the relay device 100 according to the first embodiment of the present invention will be described. FIG. 3 is a flowchart representing a procedure in the update process performed by the authentication data update section 215 of the relay device 100 shown in FIG. 2. In the update process, the authentication data update section 215 updates the first pre-shared key APSK1 and second pre-shared key APSK2 stored in the memory unit 300. The authentication data update section 215 starts the update process, according to an instruction by the user.

In step S100, the authentication data update section 215 first prepares a new pre-shared key. As a method for preparing the new pre-shared key, any method can be employed. For example, the authentication data update section 215 may employ a value inputted by the user as the new pre-shared key, or a random number value obtained by a random number generation process may be employed as the new pre-shared key.

In the next step S110, the authentication data update section 215 next stores the latest first pre-shared key APSK1, currently stored in the memory unit 300, as a new second pre-shared key APSK2 in the memory unit 300. Here, the authentication data update section 215 may delete the latest second pre-shared key APSK2 from the memory unit 300 and then store the same value (data) as the latest first pre-shared key APSK1 as a new second pre-shared key APSK2 in the memory unit 300, or overwrite the latest second pre-shared key APSK2 with the data. Alternatively, the authentication data update section 215 may delete the latest second pre-shared key APSK2 from the memory unit 300 and use the latest first pre-shared key APSK1, recognizing it as a new second pre-shared key APSK2, without deleting the latest first pre-shared key APSK1 from the memory unit 300.

Last, the authentication data update section 215 stores the new pre-shared key generated in step S100 as a new first pre-shared key APSK1 in the memory unit 300 (step S120).

According to the update process as described above, in the memory unit 300, the first pre-shared key APSK1 is a newly-prepared current-generation pre-shared key, and the second pre-shared key APSK2 is the first pre-shared key APSK1 (of one generation earlier) prior to the first pre-shared key APSK1 being updated.

Figure 4:
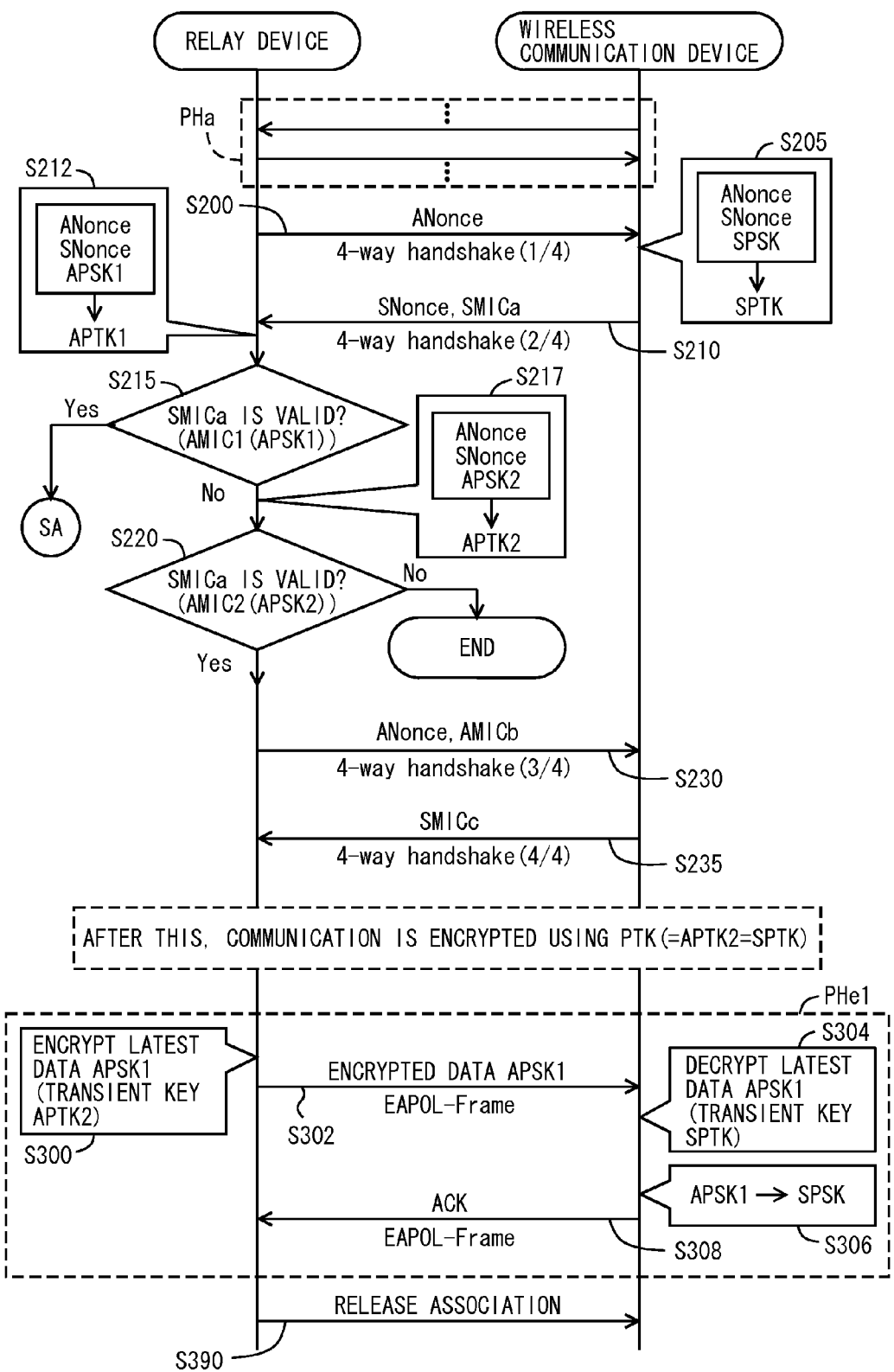
FIG. 4 is a sequence diagram showing a procedure of a connection determination process performed by the relay device 100 and wireless communications device 500.

Next, the connection determination process performed by the relay device 100 and wireless communications device 500 according to the first embodiment of the present invention will be described. FIG. 4 is a sequence diagram representing a procedure in the connection determination process performed by the relay device 100 and wireless communications device 500 shown in FIG. 2. In the present embodiment, the relay device 100 makes the connection determination, according to the WPA2-PSK scheme.

An initial process PHa is a process of forming a so-called association. In the process PHa, the relay control section 212 of the relay device 100 and the communications control section 611 of the wireless communications device 500 establish communications between the relay device 100 and the wireless communications device 500.

Subsequently, the relay control section 212 and the communications control section 611 exchange various data between them, according to a so-called 4-way handshake. The relay device 100 makes the connection determination through the exchange of the various data. It should be noted that, in the present embodiment, the relay control section 212 and the communications control section 611 use a so-called EAPOL (EAP (PPP extensible authentication protocol) over LAN) frame in the 4-way handshake.

In step S200, the latest authentication data determination section 213 of the relay device 100 generates a first random number ANonce and provides the generated first random number ANonce to the wireless communications device 500. Step S200 corresponds to the first message of the 4-way handshake.

In the next step S205, the authentication data provision section 611a of the wireless communications device 500 generates a transient key SPTK. Specifically, the authentication data provision section 611a generates a second random number SNonce and uses the generated second random number SNonce, the provided first random number ANonce, and the pre-shared key SPSK stored in the memory unit 700 to generate the transient key SPTK. The function that computes the transient key SPTK is a commonly known function adopted in the WPA (Wi-Fi Protected Access) standard. As will be described, the relay device 100 also uses the same function to compute various transient keys.

In the next step S210, the authentication data provision section 611a provides the relay device 100 with the second random number SNonce and a message integrity check SMICa. The function that computes the message integrity check SMICa is a commonly known function adopted in the WPA standard. Parameters (input values) of the function include part of the transient key SPTK and a body (including the second random number SNonce) of the EAPOL frame to be transmitted. As will be described, the relay device 100 also uses the same function to compute various message integrity checks. Step S210 corresponds to the second message of the 4-way handshake.

In the next step S212, the latest authentication data determination section 213 of the relay device 100 uses the first random number ANonce, the provided second random number SNonce, and the first pre-shared key APSK1 stored in the memory unit 300 to generate a first transient key APTK1. If the pre-shared key SPSK for the wireless communications device 500 coincides with the first pre-shared key APSK1 for the relay device 100, the generated first transient key APTK1 coincides with the transient key SPTK of the wireless communications device 500. If the pre-shared key SPSK does not coincide with the first pre-shared key APSK1, the first transient key APTK1 does not coincide with the transient key SPTK.

In the next step S215, the latest authentication data determination section 213 of the relay device 100 determines the validity of the provided message integrity check SMICa, based on the first transient key APTK1 (that is, the first pre-shared key APSK1). Specifically, the latest authentication data determination section 213 uses various items of information including the first transient key APTK1 and the body of the provided EAPOL frame (including the message integrity check SMICa) to compute a first message integrity check AMIC1. If the transient key SPTK for the wireless communications device 500 coincides with the first transient key APTK1 (that is, if the pre-shared key SPSK for the wireless communications device 500 coincides with the first pre-shared key APSK1), the computed first message integrity check AMIC1 coincides with the provided message integrity check SMICa. In this case, the message integrity check SMICa is determined to be valid, based on the first pre-shared key APSK1. A process if the provided message integrity check SMICa is valid will be described later in detail.

On the other hand, if the computed first message integrity check AMIC1 does not coincide with the provided message integrity check SMICa and thus the provided message integrity check SMICa is determined to be invalid, the former authentication data determination section 214 of the relay device 100 generates a second transient key APTK2 in step S217. The computation of the second transient key APTK2 is the same as the computation of the first transient key APTK1 except that the second pre-shared key APSK2 is used instead of the first pre-shared key APSK1.

In the next step S220, the former authentication data determination section 214 determines the validity of the provided message integrity check SMICa, based on the second transient key APTK2 (that is, the second pre-shared key APSK2). The determination of the validity of the message integrity check SMICa in step S220 is the same as the determination of the validity of the message integrity check SMICa in step S215 except that the second message integrity check AMIC2 is used instead of the first message integrity check AMIC1. The former authentication data determination section 214 uses various items of information including the second transient key APTK2 and the body of the provided EAPOL frame (including the message integrity check SMICa) to compute the second message integrity check AMIC2.

If the transient key SPTK for the wireless communications device 500 coincides with the second transient key APTK2 (that is, if the pre-shared key SPSK for the wireless communications device 500 coincides with the second pre-shared key APSK2), the computed second message integrity check AMIC2 coincides with the provided message integrity check SMICa. In this case, the message integrity check SMICa is determined to be valid, based on the second pre-shared key APSK2. On the other hand, if the computed second message integrity check AMIC2 does not coincide with the provided message integrity check SMICa and thus the provided message integrity check SMICa is determined to be invalid, the relay control section 212 ends the process.

If the message integrity check SMICa is determined to be valid, based on the second pre-shared key APSK2, the former authentication data determination section 214 provides the wireless communications device 500 with the first random number ANonce and the message integrity check AMICb in the next step S230. Specifically, the former authentication data determination section 214 uses various items of information, including part of the second transient key APTK2 and the body (including the first random number ANonce) of the EAPOL frame to be provided, to compute the message integrity check AMICb. Step S230 corresponds to the third message of the 4-way handshake.

In the next step S235, the authentication data provision section 611*a* of the wireless communications device 500 provides the relay device 100 with data including a message integrity check SMICc. Specifically, the authentication data provision section 611*a* uses various items of information, including part of the transient key SPTK and the body of the EAPOL frame to be provided, to compute the message integrity check SMICc. Step S235 corresponds to the fourth message of the 4-way handshake. It should be noted that the authentication data provision section 611*a* may determine the validity of the message integrity check AMICb before providing the data. If the message integrity check AMICb is invalid, the authentication data provision section 611*a* may end the process without executing step S235.

The former authentication data determination section 214 of the relay device 100 determines the validity of the received message integrity check SMICc. If the message integrity check SMICc is invalid, the former authentication data determination section 214 ends the process.

Successful end of the 4-way handshake processes (step S200, S210, S230, and S235) means that, while a result of the connection determination by the latest authentication data determination section 213 is negative, a result of the connection determination by the former authentication data determination section 214 is affirmative. In addition, the successful end of the 4-way handshake processes (step S200, S210, S230, and S235) results in that the relay device 100 and the wireless communications device 500 share the same second transient key APTK2 and transient key SPTK associated with the former generation second pre-shared key APSK2 and pre-shared key SPSK, respectively. A shared transient key is sometimes called a pairwise transient key. After this, the relay device 100 and the wireless communications device 500 use the second transient key APTK2 and the transient key SPTK to encrypt the communications. The encryption is performed at the layer 2. In the present embodiment, the relay control section 212 of the relay device 100 realizes the encryption and decryption at the layer 2. It should be noted that the layer 2 corresponds to the second layer (datalink layer) of a so-called OSI (Open Systems Interconnection) reference model.

In the subsequent process PHe1 (steps S300 to S308), the authentication data provision control section 216 of the relay device 100 provides the wireless communications device 500 with the latest first pre-shared key APSK1. Specifically, the authentication data provision control section 216 gives the relay control section 212 an instruction to transmit the first pre-shared key APSK1 in step S300. The relay control section 212 uses the second transient key APTK2 to encrypt the first pre-shared key APSK1. In the present embodiment, the encryption method is the AES (Advanced Encryption Standard). However, the encryption method may be another method (e.g., TKIP (Temporal Key Integrity Protocol)). In the next step S302, the relay control section 212 transmits the encrypted data to the wireless communications device 500. The entirety of components, which perform the process of transmitting the first pre-shared key APSK1 for the relay control section 212, and the authentication data provision control section 216 correspond to an "authentication data provision section 217" which provides the wireless communications device 500 with the latest first pre-shared key APSK1 (see FIG. 2).

The relay control section 212 uses the EAPOL frame to transmit the encrypted first pre-shared key APSK1. The relay control section 212 encrypts a predetermined part (including a portion that represents the first pre-shared key APSK1) of the body of the EAPOL frame. It should be noted that the predetermined part may be the entire body.

In the next step S304, the authentication data update section 613 of the wireless communications device 500 acquires the first pre-shared key APSK1 from the received encrypted data by the decryption thereof using the transient key SPTK. In step S306, the authentication data update section 613 stores the first pre-shared key APSK1 as a new pre-shared key SPSK in the memory unit 700. This makes the pre-shared key SPSK of the memory unit 700 correspond, not to the former-generation second pre-shared key APSK2, but to the latest first pre-shared key APSK1. As described above, the authentication data update section 613 updates the pre-shared key SPSK.

In the next step S308, in response to the update of the pre-shared key SPSK, the authentication data update section 613 transmits an ACK (acknowledgment response) to the relay device 100. In the present embodiment, the authentication data update section 613 uses the EAPOL frame to transmit the ACK. In the next step S390, the relay control section 212 of the relay device 100 undoes the association in response to the reception of the ACK. Specifically, the relay control section 212 transmits a so-called "disassociation frame" to the wireless communications device 500. The communications control section 611 of the wireless communications device 500 undoes the association in response to the reception of the disassociation frame. As a result, communications between the relay device 100 and the wireless communications device 500 are discontinued. In this way, communications using encryption based on the former-generation second pre-shared key APSK2 ends without continuing for long. As a result, the possibility of unauthorized access is reduced.

In the case where the wireless communications device 500 again makes a connection request to the relay device 100, the process starts from the process PHa in FIG. 4. In this case, the pre-shared key SPSK for the wireless communications device 500 is the same as the latest first pre-shared key APSK1 for the relay device 100. Therefore, in step S215, the latest authentication data determination section 213 determines the message integrity check SMICa to be valid, based on the first pre-shared key APSK1.

FIG. 5 is a sequence diagram representing a process performed if the determination result in step S215 of FIG. 4 is affirmative. In this case, as the third and fourth processes of the 4-way handshake, steps S430 and S435 shown in FIG. 5 are executed instead of respective steps S230 and S235 of FIG. 4.

In step S430, the latest authentication data determination section 213 of the relay device 100 generates a message integrity check AMICd and transmits the message integrity check AMICd and the first random number ANonce to the wireless communications device 500. The computation of the message integrity check AMICd is the same as the computation of the message integrity check AMICb in step S230, except that the first transient key APTK1 is used instead of the second transient key APTK2.

In step S435, the authentication data provision section 611a of the wireless communications device 500 transmits the message integrity check SMICe to the relay device 100. The computation of the message integrity check SMICe is the same as the computation of the message integrity check SMICc in step S235 (FIG. 4).

It should be noted that the authentication data provision section 611a and the latest authentication data determination section 213 may determine the validity of the message integrity checks AMICd and SMICe, respectively. The authentication data provision section 611a and the latest authentication data determination section 213 each may proceed with the process if an affirmative determination result is obtained.

The successful end of the 4-way handshake processes (step S200, S210, S430, and S435) means that the result of the connection determination by the latest authentication data determination section 213 is affirmative. In addition, in response to the successful end of the 4-way handshake processes (step S200, S210, S430, and S435), the relay device 100 and wireless communications device 500 share the same first transient key APTK1 and transient key SPTK associated with the latest first pre-shared key APSK1 and the pre-shared key SPSK, respectively. After this, the relay device 100 and the wireless communications device 500 use the first transient key APTK1 and the transient key SPTK to encrypt the communications. For example, the relay control section 212 of the relay device 100 and the communications control section 611 of the wireless communications device 500 may encrypt the communications. In addition, (step S450) the relay control section 212 relays communications between the wireless communications device 500 and various communications devices (e.g., a mail server connected to the network 910).

As described above, according to the network system 1000 involving the first embodiment of the present invention, the relay device 100 updates the first pre-shared key APSK1 to reduce the possibility of the unauthorized access. Even if the update of the first pre-shared key APSK1 makes the message integrity check SMICa no longer valid based on the first pre-shared key APSK1, if the message integrity check SMICa is valid based on the second pre-shared key APSK2, the relay device 100 provides the wireless communications device 500 with the first pre-shared key APSK1. Therefore, an authorized user's wireless communications device 500 is able to acquire the latest first pre-shared key APSK1 without overburdening the user. The wireless communications device 500 then stores the provided first pre-shared key APSK1 as an updated pre-shared key SPSK in the memory unit 700. As a result, the wireless communications device 500 is able to update the pre-shared key SPSK without overburdening the user. As the result of above, the relay device 100 and the wireless communications device 500 can reduce the possibility of the unauthorized access while avoiding overburdening the user.

It should be noted that, similarly to the wireless communications device 500, another wireless communications device (e.g., the wireless communications device 502) different from the wireless communications device 500 may update the pre-shared key SPSK. If a plurality of wireless communications devices automatically update the pre-shared key SPSK, the user can avoid being overburdened even in the case of using the plurality of wireless communications devices. As a result, the user can increase the frequency of updating the first pre-shared key APSK1 while avoiding being overburdened. As a result, the user can reduce the possibility of the unauthorized access to a large extent.

Also, the relay device 100 encrypts and transmits the first pre-shared key APSK1 to the wireless communications device 500, and the wireless communications device 500 acquires the first pre-shared key APSK1 by the decryption thereof. As a result, the relay device 100 and the wireless communications device 500 can reduce the possibility that an unauthorized user illegitimately identifies the latest first pre-shared key APSK1. Here, the relay control section 212 uses a common-key cryptography (the AES in the first embodiment) to encrypt the first pre-shared key APSK1. Therefore, the wireless communications device 500 is able to decrypt the first pre-shared key APSK1 if a correct common key is available to the user. As a result, the possibility that a user having no correct common key illegitimately identifies the latest first pre-shared key APSK1 can be reduced. It should be noted that "common-key cryptography" means cryptography that uses the same encryption key for encryption and decryption. Common-key cryptography is also referred to as "symmetric-key cryptography."

Second Embodiment

In a second embodiment, another method of the process, described in the first embodiment, of providing the wireless communications device 500 with the first pre-shared key APSK1 from the relay device 100 will be described.

Figure 6:
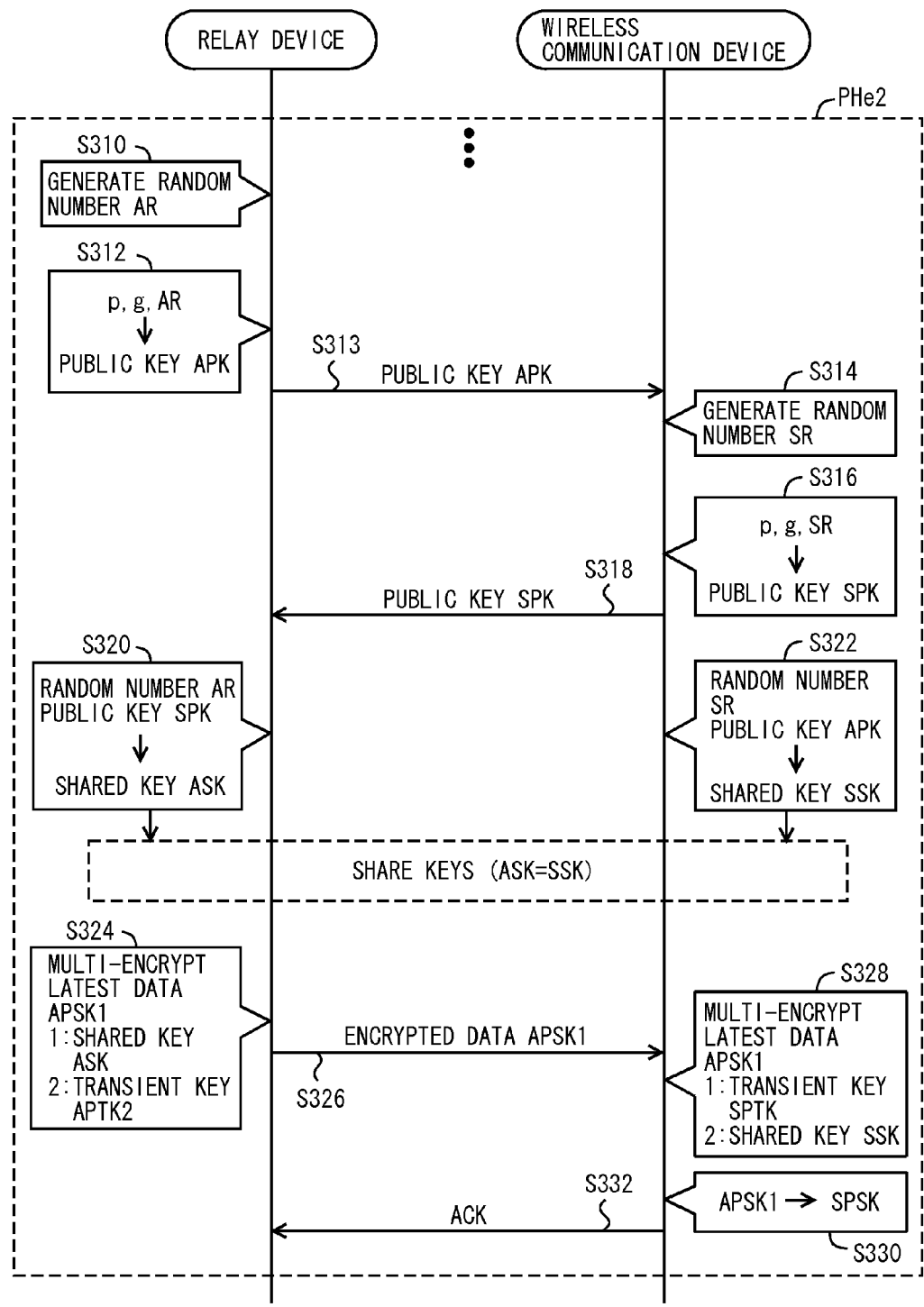
FIG. 6 is a sequence diagram showing another embodiment of a process of providing a latest first pre-shared key APSK1 from a relay device 100 to a wireless communications device 500 in a second embodiment of the present invention.

FIG. 6 is a sequence diagram showing another embodiment of the process of providing the wireless communications device 500 with the latest first pre-shared key APSK1 from the relay device 100 in the second embodiment. In the second embodiment, a process PHe2 (steps S310 to S332) shown in FIG. 6 is executed instead of the process PHe1 (steps S300 to S308) shown in FIG. 4. It should be noted that the configurations of the relay device 100 and wireless communications device 500 according to the second embodiment are the same as the configurations of the relay device 100 and wireless communications device 500 shown in FIG. 1 and FIG. 2, respectively, thus the description thereof is omitted.

In the present embodiment, the authentication data provision section 217 of the relay device 100 doubly encrypts the first pre-shared key APSK1. Because of this, the authentication data provision section 217 shares, in addition to the second transient key APTK2, another encryption key with the authentication data update section 613 of the wireless communications device 500. Specifically, the relay device 100 (the authentication data provision section 217) and the wireless communications device 500 (the authentication data update section 613) share the other encryption key, according to so-called Diffie-Hellman key exchange. Hereinafter, the Diffie-Hellman key exchange is also called "D-H key exchange."

In the first step S310, the authentication data provision control section 216 of the relay device 100 generates a random number AR. In the next step S312, the authentication data provision control section 216 uses the random number AR and predetermined integers p and g to generate a public key APK. The integer p is a prime number and the integer g is a primitive root mod p. A function which generates the public key APK is defined by the D-H key exchange. In the next step S313, the authentication data provision control section 216 provides the relay control section 212 with an instruction of transmitting the generated public key APK, and the relay control section 212 provides the wireless communications device 500 with the public key APK. At the time, the relay control section 212 may use the second transient key APTK2 to encrypt the public key APK.

In the next step S314, the authentication data update section 613 of the wireless communications device 500 generates a random number SR. In the next step S316, the authentication data update section 613 uses the random number SR and the predetermined integers p and g to generate a public key SPK. A function which generates the public key SPK is the same function as which generates the public key APK described above. In the next step S318, the authentication data update section 613 provides the relay device 100 with the generated public key SPK. At the time, the authentication data update section 613 may use the transient key SPTK to encrypt the public key SPK.

In the next step S320, the authentication data provision control section 216 of the relay device 100 uses the random number AR and the public key SPK to generate a shared key ASK. A function which generates the shared key ASK is defined by the D-H key exchange. If the public key SPK received in step S318 is encrypted, the relay control section 212 uses the second transient key APTK2 to decrypt the public key SPK.

In step S322, the authentication data update section 613 of the wireless communications device 500 uses the random number SR and the public key APK to generate a shared key SSK. A function which generates the shared key SSK is the same function as which generates the shared key ASK described above. If the public key APK received in step S313 is encrypted, the authentication data update section 613 uses the transient key SPTK to decrypt the public key APK.

According to the above process (steps S310 to S322), the relay device 100 (the authentication data provision section 217) and the wireless communications device 500 (the authentication data update section 613) share the same shared keys ASK and SSK.

In the next step S324, the authentication data provision control section 216 of the relay device 100 uses the shared key ASK to encrypt the first pre-shared key APSK1. In the present embodiment, the encryption method is the ARCFOUR (Alleged-RC (Rivest's Cipher) 4). However, the encryption method may be of any kind. The authentication data provision control section 216 provides the relay control section 212 with an instruction of transmitting encrypted data. The relay control section 212 uses the second transient key APTK2 to further encrypt the encrypted data. In the next step S326, the relay control section 212 transmits the doubly encrypted data to the wireless communications device 500. It should be noted that the relay control section 212 may encrypt a predetermined part (including the first pre-shared key APSK1 encrypted by the shared key ASK) of the body of a MAC (Media Access Control) frame to be transmitted. The predetermined part may be the entire body.

In the next step S328, the authentication data update section 613 of the wireless communications device 500 acquires the first pre-shared key APSK1 from the received encrypted data by decryption thereof using the transient key SPTK and another decryption thereof using the shared key SSK. In step S330, the authentication data update section 613 stores the first pre-shared key APSK1 as a new pre-shared key SPSK in the memory unit 700.

As described above, according to the second embodiment, the authentication data provision section 217 of the relay device 100 doubly encrypts the first pre-shared key APSK1 to transmit to the wireless communications device 500. The authentication data update section 613 of the wireless communications device 500 acquires the first pre-shared key APSK1 by the double decryption thereof. As a result, the possibility that an unauthorized user illegitimately identifies the latest first pre-shared key APSK1 can be reduced.

It should be noted that the relay device 100 (the authentication data provision section 217) and the wireless communications device 500 (the authentication data update section 613) may proceed the respective processes, according to the D-H key exchange, based on a procedure defined by the PBC (Push Button Configuration) of the WPS (Wi-Fi Protected Setup). According to the WPS-PBC, an access point (corresponds to the relay device 100), including a registrar and an enrollee (corresponds to the wireless communications device 500) exchange various types of messages therebetween. For the cryptographic protection of the messages, the access point and the enrollee use the encryption key which is computed using the D-H key exchange. Therefore, the relay device 100 and the wireless communications device 500 are able to share the shared keys ASK and SSK by the D-H key exchange, according to the procedure of the WPS-PBC. Here, the relay device 100 (the authentication data provision section 217) and the wireless communications device 500 (the authentication data update section 613) may employ a process which follows after respective push buttons of the access point (registrar) and enrollee are pressed down, as the process according to the D-H key exchange.

Third Embodiment

In a third embodiment, another method of the process, described in the first embodiment, of updating the first pre-shared key APSK1 and the second pre-shared key APSK2 will be described.

FIG. 7 is a block diagram showing in detail respective configurations of a relay device 100a and wireless communications device 500 according to the third embodiment of the present invention. The configuration of the wireless communications device 500 according to the third embodiment is the same as the configuration of the wireless communications device 500 according to the first embodiment shown in FIG. 2. The configuration of the relay device 100a according to the third embodiment is the configuration of the relay device 100 according to the first embodiment shown in FIG. 2 which has an update schedule determination section 218 added thereto.

In the third embodiment, the authentication data update section 215 executes an update process shown in FIG. 3, according to a schedule determined by the update schedule determination section 218. The procedure of the connection determination process and the provision process of the first pre-shared key APSK1 are the same as those of the processes shown in FIG. 4, FIG. 5, and FIG. 6. A program 304a stored in the memory unit 300 includes a program (module) for the update schedule determination section 218, in addition to respective programs (modules) for process sections 212, 213, 214, 215, and 216.

Figure 8A:
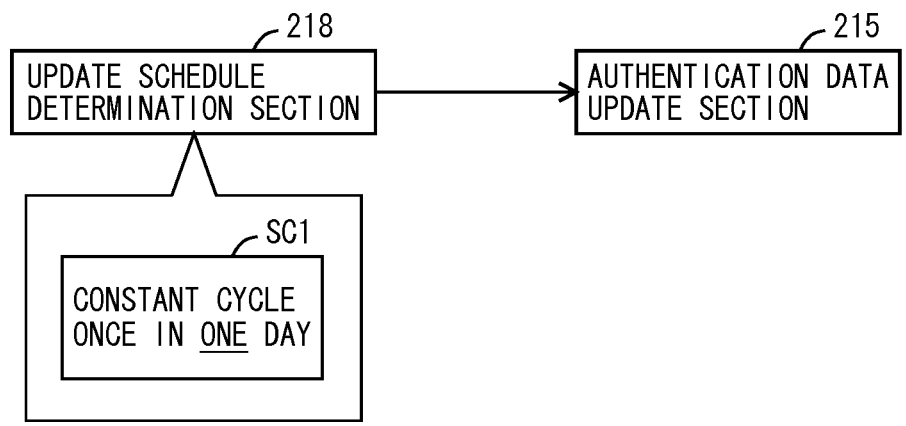
FIG. 8A and FIG. 8B are diagrams each showing an example of a schedule determined by an update schedule determination section 218.
Figure 8B:
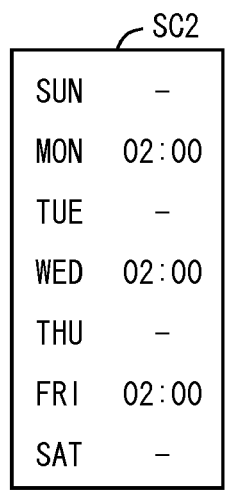

FIG. 8A and FIG. 8B each show an example of a schedule determined by the update schedule determination section 218 shown in FIG. 7. The update schedule determination section 218 determines the schedule, according to instructions from the user.

The schedule shown in FIG. 8A by way of example is a schedule SC1 having a constant cycle. The authentication data update section 215 automatically executes the update process shown in FIG. 3, according to the schedule SC1. The schedule SC1 shown in FIG. 8A by way of example has the constant cycle of once a day, but may be any various cycles, such as once in n days or once in n hours (n is an integer equal to or greater than 1).

The schedule shown in FIG. 8B by way of example is a schedule SC2 in combination of a day of the week and time. The authentication data update section 215 automatically executes the update process shown in FIG. 3, according to the schedule SC2. The schedule SC2 shown in FIG. 8B by way of example indicates that the update process starts on Monday 02:00, Wednesday 02:00, and Friday 02:00.

As described above, according to the third embodiment, the authentication data update section 215 automatically updates the first pre-shared key APSK1 and the second pre-shared key APSK2, according to schedule, thus automatically reduces the possibility of the unauthorized access.

It should be noted that the update schedule determination section 218 may determine the schedule in any other format. For example, the update schedule determination section 218 may determine the schedule in a format of year, month, and day. In any case, the authentication data update section 215 may employ the random number value obtained by the random number generation process as a new first pre-shared key APSK1, or employ a value previously inputted by the user as a new first pre-shared key APSK1.

Modification 1

In each embodiment described above, the authentication data update section 215 (FIG. 2 and FIG. 7) may hold a pre-shared key of an even older generation than the second pre-shared key APSK2 in the memory unit 300 (the generation of the pre-shared key becomes older each time the pre-shared key is updated). In general, the authentication data update section 215 may hold the pre-shared key of two to L generations earlier in the memory unit 300 (the value L is an integer equal to or greater than 2). In steps S220 and S235 shown in FIG. 4, if the message integrity checks SMICa and SMICc are valid based on any pre-shared key of two to L generations earlier, the former authentication data determination section 214 may proceed the process without ending it. Here, if the value L is equal to or greater than 3, the wireless communications device 500 can acquire the latest first pre-shared key APSK1 even in the case where the relay device 100 updates the pre-shared key multiple times (L−1 times) without the wireless communications device 500 updating the pre-shared key SPSK. Therefore, in the case where the user uses the plurality of wireless communications devices, the user may update the pre-shared key SPSK of each wireless communications device before the relay device 100 updates the pre-shared key "L−1" times.

Modification 2

In each embodiment described above, data which the authentication data provision section 611a (FIG. 2 and FIG. 7) provides to the relay device 100 for the connection determination is not limited to the message integrity checks, and various data determined using the pre-shared key SPSK may be employed. For example, the authentication data provision section 611a may provide the relay device 100 with data (corresponds to the request-authentication data) obtained by encrypting the pre-shared key SPSK (corresponds to the reference authentication data). The encryption method may be of any kind, such as the AES or the TKIP. Also, the authentication data provision section 611a may provide the pre-shared key SPSK as it is to the relay device 100.

Also, in each embodiment described above, various methods may be employed as the method for the latest authentication data determination section 213 and the former authentication data determination section 214 to determine the request-authentication data from the wireless communications device 500 to be valid or not (that is, the pre-shared key SPSK of the wireless communications device 500 is valid or not). For example, if the request-authentication data coincides with a predetermined data, the latest authentication data determination section 213 and the former authentication data determination section 214 may determine the request-authentication data to be valid.

Modification 3

In each embodiment described above, various methods may be employed as the encryption method for the latest first pre-shared key APSK1 by the authentication data provision section 217. For example, the encryption method may be an asymmetric-key cryptography. The asymmetric-key cryptography means cryptography in which the encryption key for decryption is different from the encryption key for encryption. Alternatively, the encryption of the first pre-shared key APSK1 may be multi-encryption. In this case, the encryption of the first pre-shared key APSK1 may be a combination of the common-key cryptography and the asymmetric-key cryptography. In this case also, the authentication data provision section 217 can use the common-key cryptography to encrypt the first pre-shared key APSK1. Here, the multiplicity of the encryption may be two, three, or more. In addition, not limiting to the layer 2, the encryption may be performed at any layer level of the OSI reference model. For example, the encryption may be performed at a layer 1 level or a layer 3 level.

In addition, the authentication data provision section 217 may use a predetermined key as the encryption key used for the encryption. For example, the authentication data provision control section 216 may use the second pre-shared key APSK2 to encrypt the first pre-shared key APSK1. In this case, the authentication data update section 613 of the wireless communications device 500 acquires the first pre-shared key APSK1 by the decryption thereof using the pre-shared key SPSK. Also, the authentication data provision section 217 may dynamically generate the encryption key and provide the generated encryption key to the wireless communications device.

Also, the authentication data provision section 217 may transmit the first pre-shared key APSK1 to the wireless communications device without encryption.

Also, in each embodiment described above, the procedure of the provision of the latest first pre-shared key APSK1 is not limited to those shown in FIG. 4 and FIG. 6, and may be various other procedures. For example, instead of the EAPOL frame, a data frame, one type of MAC frames may deliver the first pre-shared key APSK1.

Modification 4

In each embodiment described above, the procedure of the connection determination is not limited to those shown in FIG. 4 and FIG. 5, and may be various other procedures. For example, the latest authentication data determination section 213 and the former authentication data determination section 214 may receive the request-authentication data from the wireless communications device 500 once, without performing the procedure of the 4-way handshake. Then, the latest authentication data determination section 213 and the former authentication data determination section 214 may determine whether the received request-authentication data is valid.

Modification 5

In each embodiment described above, the configuration of the relay device 100 is not limited to those shown in FIG. 2 and FIG. 7, and various configurations may be employed. For example, the wired interface 392 may be omitted. In this case, the network 910 may be connected to the wireless interface 390. Similarly, the configuration of the wireless communications device 500 is not limited to those shown in FIG. 2 and FIG. 7, and various configurations may be employed. For example, the authentication data provision section 611a may be provided in the wireless interface 790.

Also, the wireless communications device 500 connected to the relay device 100 by the wireless communications is not limited to the wireless terminal, and may be another relay device. In this case, the other relay device may operate in the same manner as the wireless communications device 500 in the sequence diagrams shown in FIG. 4, FIG. 5, and FIG. 6 does.

It should be noted that, while, in each embodiment described above, the CPU executes firmware or computer programs stored in the memory to realize each component of the relay device and wireless communications device, the components of the present invention may be realized as appropriate by hardware, and also by software. For example, the function (the function of the authentication data provision control section 216 or relay control section 212 shown in FIG. 2, FIG. 7) of encrypting the first pre-shared key APSK1 may be realized by a dedicated hardware circuit.

Further, if all or some of the functions of the present invention are realized by software, the software (computer program) may be provided in a form stored in a computer readable storage medium. In the present invention, the computer readable storage medium includes not only portable storage medium such as flexible disks and CD-ROMs, but also various internal storage units in computers such as RAMs and ROMs, and external storage units fitted to computers such as hard disks.

While the invention has been described in detail, the foregoing description is in all aspects illustrative and not restrictive. For example, additional factor in the context of the present invention can be omitted as appropriate. Also, it will be understood that, besides the modifications described above, numerous other modifications and variations can be devised without departing from the scope of the invention.

What is claimed is:

1. A relay device for carrying out wireless communications with a wireless communications device via a communications interface, the relay device comprising:
   a memory unit storing a plurality of authentication data for determining whether request-authentication data received from the wireless communications device requesting relayed communications with another communications device is valid;
   an authentication data updating section for updating current-generation authentication data, and storing, in the memory unit, the updated current-generation authentication data as latest authentication data and storing authentication data at least one generation earlier than the updated current-generation authentication data as former authentication data;
   a latest authentication data determination section for using the latest authentication data to determine whether the request-authentication data received from the wireless communications device is valid;
   a relay control section for executing the requested relayed communications if the latest authentication data determination section has determined that the request-authentication data is valid;
   a former authentication data determination section for using the former authentication data to determine whether the request-authentication data is valid if the latest authentication data determination section has determined that the request-authentication data is invalid; and an authentication data provision section for providing the latest authentication data to the wireless communications device if the former authentication data determination section has determined that the request-authentication data is valid.

2. The relay device according to claim 1, wherein the authentication data provision section encrypts the latest authentication data and transmits the encrypted latest authentication data to the wireless communications device.

3. The relay device according to claim 2, wherein the authentication data provision section uses common-key cryptography to encrypt the latest authentication data.

4. The relay device according to claim 2, wherein the authentication data provision section multi-encrypts the latest authentication data.

5. The relay device according to claim 3, wherein the authentication data provision section multi-encrypts the latest authentication data.

6. The relay device according to claim 1, further comprising:
an update schedule determination section for determining a schedule whereby the current-generation authentication data is updated by the authentication data update section; wherein
the authentication data update section automatically updates the authentication data, according to the schedule determined by the update schedule determination section.

7. The relay device according to claim 2, further comprising
an update schedule determination section for determining a schedule whereby the current-generation authentication data is updated by the authentication data update section, wherein
the authentication data update section automatically updates the authentication data, according to the schedule determined by the update schedule determination section.

8. The relay device according to claim 3, further comprising
an update schedule determination section for determining a schedule whereby the current-generation authentication data is updated by the authentication data update section, wherein
the authentication data update section automatically updates the authentication data, according to the schedule determined by the update schedule determination section.

9. The relay device according to claim 4, further comprising
an update schedule determination section for determining a schedule whereby the current-generation authentication data is updated by the authentication data update section; wherein
the authentication data update section automatically updates the authentication data according to the schedule determined by the update schedule determination section.

10. The relay device according to claim 5, further comprising
an update schedule determination section for determining a schedule whereby the current-generation authentication data is updated by the authentication data update section, wherein
the authentication data update section automatically updates the authentication data, according to the schedule determined by the update schedule determination section.

11. A network system including a relay device and a wireless communications device between which wireless communications are carried out via communications interface,
the relay device comprising:
a memory unit storing a plurality of authentication data for determining whether request-authentication data received from the wireless communications device requesting relayed communications with another communications device is valid;
an authentication data updating section for updating current-generation authentication data, and storing, in the memory unit, the updated current-generation authentication data as latest authentication data and storing authentication data at least one generation earlier than the updated current-generation authentication data as former authentication data;
a latest authentication data determination section for using the latest authentication data to determine whether the request-authentication data received from the wireless communications device is valid;
a relay control section for executing the requested relayed communications if the latest authentication data determination section has determined that the request-authentication data is valid;
a former authentication data determination section for using the former authentication data to determine whether the request-authentication data is valid if the latest authentication data determination section has determined that the request-authentication data is invalid; and
an authentication data provision section for providing the wireless communications device with the latest authentication data if the former authentication data determination section has determined that the request-authentication data is valid; and
the wireless communications device comprising:
a memory unit storing reference authentication data for verifying the request-authentication data requested of the relay device;
a request-authentication data provision section for using the reference authentication data stored in the memory unit to verify the request-authentication data, and for providing the verified request-authentication data to the relay device; and
an authentication data update section for acquiring latest authentication data from data provided by the relay device, and updating, by the acquired latest authentication data, the reference authentication data stored in the memory unit.

12. A computer readable nontransitory storage medium having stored therein a program executable by a relay device whereby wireless communications with a wireless communications device via a communications interface are carried out, the program causing the relay device to perform steps of:
updating current-generation authentication data, and storing, in a memory unit, the updated current-generation authentication data as latest authentication data, and storing authentication data at least one generation earlier than the updated current-generation authentication data as former authentication data;
using the latest authentication data to determine whether request-authentication data received from the wireless communications device, requesting relayed communications with another communications device, is valid;

executing the requested relayed communications if it has been determined using the latest authentication data that the request-authentication data is valid;

using the former authentication data to determine whether the request-authentication data is valid if it has been determined using the latest authentication data that the request-authentication data is invalid; and providing the latest authentication data to the wireless communications device if it has been determined, using the former authentication data, that the request-authentication data is valid.

13. A method for controlling a network system including a relay device and a wireless communications device between which wireless communications are carried out via communications interface, the method comprising steps of:

in the relay device, updating current-generation authentication data and storing, in a memory unit included in the relay device, the updated current-generation authentication data as latest authentication data, and storing authentication data at least one generation earlier than the updated current-generation authentication data, as former authentication data;

in the wireless communications device, using reference authentication data stored in a memory unit included in the wireless communications device to verify, request-authentication data whereby relayed communications with another communications device is requested of the relay device;

in the wireless communications device, providing the determined verified request-authentication data to the relay device;

in the relay device, using the latest authentication data to determine whether the request-authentication data received from the wireless communications device, requesting relayed communications with the other communications device is valid;

in the relay device, executing the requested relayed communications if it has been determined using the latest authentication data that the request-authentication data is valid;

in the relay device, using the former authentication data to determine whether the request-authentication data is valid if it has been determined using the latest authentication data that the request-authentication data is invalid;

in the relay device, providing the latest authentication data to the wireless communications device if it has been determined using the former authentication data that the request-authentication data is valid; and in the wireless communications device, updating the reference authentication data stored in the memory unit included in the wireless communications device, by the latest authentication data provided from the relay device.

14. A method executable by a relay device for carrying out wireless communications with a wireless communications device via a communications interface, the method comprising steps of:

updating current-generation authentication data, and storing the updated current-generation authentication data as latest authentication data and storing authentication data at least one generation earlier than the updated current-generation authentication data as former authentication data;

using the latest authentication data to determine whether request-authentication data, received from the wireless communications device, requesting wireless communications with another communications device is valid;

executing the requested wireless communications if it has been determined, using the latest authentication data, that the request-authentication data is valid;

using the former authentication data to determine whether the request-authentication data is valid if it has been determined, using the latest authentication data, that the request-authentication data is invalid; and providing the latest authentication data to the wireless communications device if it has been determined, using the former authentication data, that the request-authentication data is valid.

15. A wireless access point network-communicable with wireless communications devices transmitting communication request-authentication data that the access point receives via a communications interface thereof, the access point comprising:

an authentication-data memory storing at least a latest, current-generation pre-shared key and a former, one-generation-earlier pre-shared key; and a control section having
a schedulable authentication-data updating function operating to update, on a pre-determinable scheduled basis, the current-generation pre-shared key stored in said authentication data memory with a new latest pre-shared key, and store the pre-updated current-generation key as the former, one-generation-earlier pre-shared key, a determine-if-latest-key function operating to receive communication request-authentication data from a wireless communications device and validate the request-authentication data against the latest pre-shared key in said authentication data memory, a relay control function operating to network-relay communications from/to the communications device in response to validation of the communication request-authentication data by said determine-if-latest-key function, a determine-if-former-key function operating to validate the request-authentication data against the former pre-shared key in said authentication data memory if said determine-if-latest-key function determines that the request-authentication data is not valid, and an update requesting-device-key function operating to provide the wireless communications device with the latest pre-shared key, as updated by said updating function, if said determine-if-former-key function determines that the request-authentication data is valid in the event that said determine-if-latest-key function determines that the request-authentication data is not valid.

* * * * *